United States Patent
Peng et al.

(10) Patent No.: US 12,180,409 B1
(45) Date of Patent: Dec. 31, 2024

(54) DOUBLE-CROSSLINKED THERMAL PHASE TRANSITION GEL TEMPORARY PLUGGING AGENT AND APPLICATION THEREOF

(71) Applicant: SOUTHWEST PETROLEUM UNIVERSITY, Chengdu (CN)

(72) Inventors: Yu Peng, Chengdu (CN); Pengjun Shi, Chengdu (CN); Yongming Li, Chengdu (CN); Zhenglan Li, Chengdu (CN); Jiandu Ye, Chengdu (CN); Jinzhou Zhao, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 18/824,209

(22) Filed: Sep. 4, 2024

(30) Foreign Application Priority Data

May 9, 2024 (CN) .......................... 202410569239.4

(51) Int. Cl.
| | | |
|---|---|---|
| *C08F 220/06* | (2006.01) | |
| *C08F 220/20* | (2006.01) | |
| *C08F 220/58* | (2006.01) | |
| *C09K 5/06* | (2006.01) | |
| *C09K 8/00* | (2006.01) | |
| *C08K 3/34* | (2006.01) | |
| *C08K 3/38* | (2006.01) | |
| *C09K 8/24* | (2006.01) | |
| *C09K 8/512* | (2006.01) | |

(52) U.S. Cl.
CPC .............. *C09K 5/06* (2013.01); *C08F 220/06* (2013.01); *C08F 220/20* (2013.01); *C08F 220/585* (2020.02); *C08K 3/346* (2013.01); *C08K 3/38* (2013.01); *C09K 8/24* (2013.01); *C09K 8/512* (2013.01)

(58) Field of Classification Search
CPC ......... C09K 8/512; C09K 8/24; C08F 220/06; C08F 220/585; C08F 220/20; C08K 3/38; C08K 3/346

See application file for complete search history.

(56) References Cited

U.S. PATENT DOCUMENTS

| | | |
|---|---|---|
| 4,643,255 A | 2/1987 | Sandiford |
| 5,304,620 A | 4/1994 | Holtmyer |

FOREIGN PATENT DOCUMENTS

| | | | | |
|---|---|---|---|---|
| CA | 2930362 A1 | 5/2015 | | |
| CA | 3196695 A1 | 5/2022 | | |
| CN | 102191023 A | 9/2011 | | |
| CN | 106190087 B | 2/2019 | | |
| CN | 110003870 A | 7/2019 | | |
| CN | 110669484 A | 1/2020 | | |
| CN | 111087988 A | * | 5/2020 | ............... C09K 8/44 |
| CN | 111088023 A | * | 5/2020 | ............. C09K 8/592 |
| CN | 111286311 A | | 6/2020 | |
| CN | 110698589 B | * | 9/2021 | ............ C08F 220/56 |
| CN | 113736438 A | | 12/2021 | |
| CN | 114044851 A | | 2/2022 | |
| CN | 115558053 A | | 1/2023 | |
| CN | 115785929 A | | 3/2023 | |
| CN | 116103027 A | | 5/2023 | |

OTHER PUBLICATIONS

Guo Jintang et al. "Synthesis and Performance Evaluation of Temporary Plugging Agent Used in High-Temperature Reservoir" Journal of Tianjin University(Science and Technology), vol. 52, No. 1, Dec. 25, 2018 (Dec. 25, 2018), pp. 1-6.

Liu, Zhiqin et al. "The Development and Deployment of Degradable Temporary Plugging Material for Ultra-Deepwater Wells" vol. 11, No. 6, Jun. 30, 2023 (Jun. 30, 2023).

* cited by examiner

*Primary Examiner* — Rip A Lee

(74) *Attorney, Agent, or Firm* — Jeenam Park

(57) ABSTRACT

The present invention discloses a double-crosslinked thermal phase transition gel temporary plugging agent and an application thereof, and relates to the technical field of oil and gas field development. The gel temporary plugging agent comprises the following components in percentage by weight: 5.8-18.3% of acrylic acid, 2.8-6.5% of 2-acrylamide-2-methylpropanesulfonic acid, 2.8-7.0% of hydroxyethyl acrylate, 0.2-1.0% of a degradable crosslinking agent, 0.4-1.2% of borax or boric acid, 0.2-0.8% of a high-temperature initiator, 2.6-4.5% of palygorskite attapulgite, 1.5-3.1% of a urea-formaldehyde resin, and the balance of water, wherein the gel temporary plugging agent is formed by underground gelation. The gel temporary plugging agent is applied to oil and gas reservoirs with a temperature of 100-150° C., can automatically be subjected to gelation and degradation, and has a low filtration loss before gelation.

2 Claims, 1 Drawing Sheet

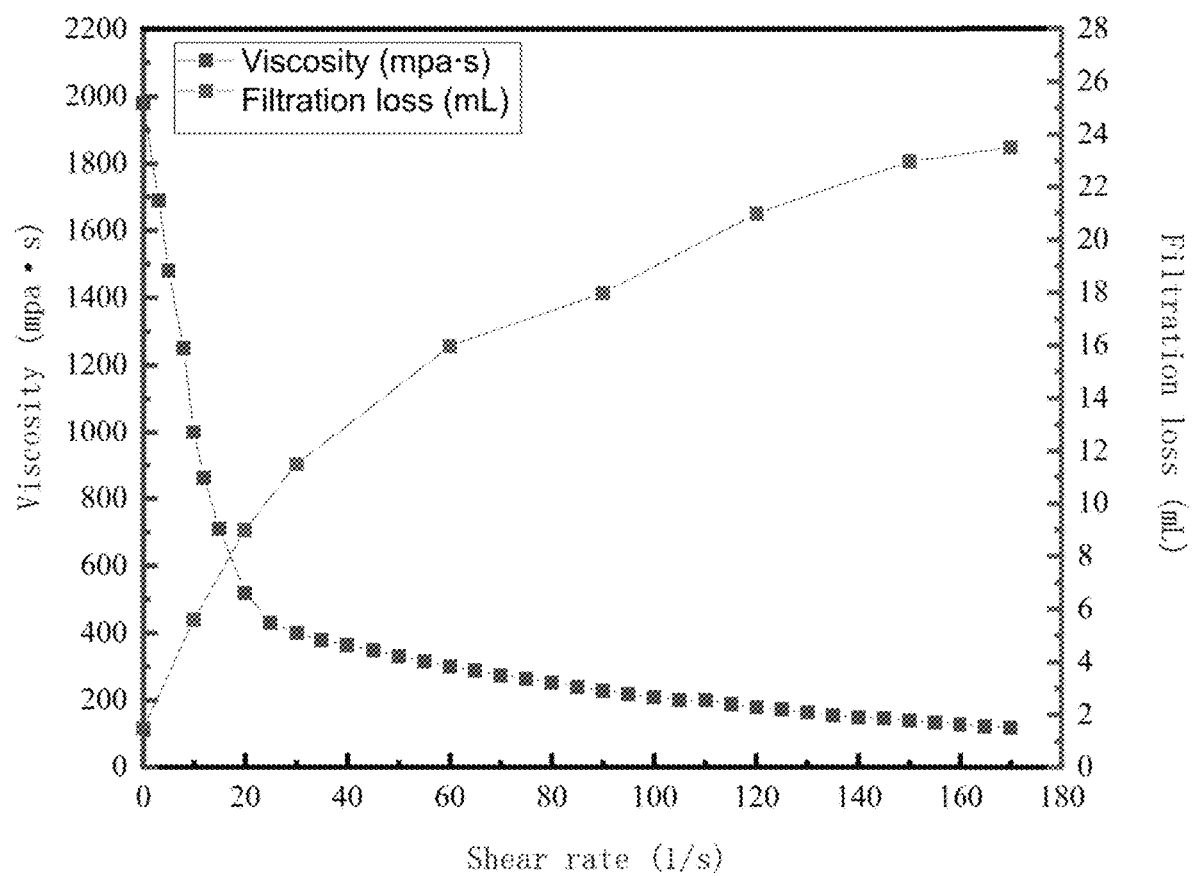

DOUBLE-CROSSLINKED THERMAL PHASE TRANSITION GEL TEMPORARY PLUGGING AGENT AND APPLICATION THEREOF

CROSS-REFERENCE TO RELATED APPLICATIONS

This application claims priority to Chinese Patent Application No. 202410569239.4, filed on May 9, 2024, which is hereby incorporated by reference in its entirety.

TECHNICAL FIELD

The present invention relates to the technical field of oil and gas field development, and in particular, to a double-crosslinked thermal phase transition gel temporary plugging agent and an application thereof.

BACKGROUND

In recent years, temporary plugging and diverting fracturing technique has been widely applied to various fields of unconventional oil and gas resource development. In the construction process, a temporary plugging diverter plays an important role in plugging old fractures and opening new fractures, and directly influences the effect of reservoir fracturing stimulation. At present, temporary plugging agents can be classified into a preformed temporary plugging agent and an in-situ temporary plugging agent based on whether chemical changes occur before and after plugging. The most of preformed temporary plugging agents are solid and have the advantages of high plugging strength and a wide applicable temperature range. However, the solid temporary plugging agent has poor injectability and high requirements on ground equipment, which limits the application of the preformed temporary plugging agent. The in-situ temporary plugging agent is liquid at room temperature and solidify in the microcracks and micropores to finish plugging, which is not limited by any well type or well completion method, so that the in-situ temporary plugging agent is widely applied to oil fields. The current gel temporary plugging agent generally constructs a gel network in a single cross-linking method. Although the formed gel temporary plugging agent has high strength, this highly crosslinked rigid polymer network shows a certain degree of brittleness due to the lack of a mechanism to dissipate external forces. During hydraulic fracturing, the brittle gel is very easy to break under the alternating loads, resulting in temporary plugging failure. Therefore, some researchers have proposed a double-crosslinked gel. The double-crosslinked gel contains two crosslinking structures and can form two crosslinked networks, and gaps of a first crosslinked network can be filled by introducing a second crosslinked network to enhance the mechanical property of the gel temporary plugging agent. Chinese Patent Application Publication No. CN115785929A prepares a high-temperature-resistant and high-mineralization-resistant double-crosslinked gel system. The system has good stability at 170° C. and has the potential for application in high- and ultrahigh-temperature reservoirs. However, this system can be degraded under the action of a gel breaker, and the gel breaking of the gel breaker often has the problems that gel breaking time is difficult to control, more residues exist in a stratum after gel breaking, and secondary damage is easily caused to the stratum.

Based on this, more and more scholars have begun to research a thermal phase transition temporary plugging agent. Chinese Patent Application Publication No. CN106190087B discloses a thermally responsive temporary plugging diverter. This system is a liquid with low viscosity and capable of flowing at room temperature, when the temperature rises to 60-90° C., the diverter has a rapidly increased viscosity and loses the fluidity, and when the temperature continues rising to 90-150° C., the diverter automatically breaks into small molecules and recovers to a low-viscosity flowable state. Although this system achieves thermal phase transition, the required liquid-solid-liquid phase transition temperature is different, and it is difficult to heat the stratum in actual production. Therefore, this thermal phase transition system still has certain limitations.

SUMMARY

To solve at least one of the above problems, the present invention provides a double-crosslinked thermal phase transition gel temporary plugging agent and an application thereof.

A specific solution of the present invention is as follows: a double-crosslinked thermal phase transition gel temporary plugging agent comprises the following components in percentage by weight: 5.8-18.3% of acrylic acid, 2.8-6.5% of 2-acrylamide-2-methylpropanesulfonic acid, 2.8-7.0% of hydroxyethyl acrylate, 0.2-1.0% of a degradable crosslinking agent, 0.4-1.2% of borax or boric acid, 0.2-0.8% of a high-temperature initiator, 2.6-4.5% of palygorskite attapulgite, 1.5-3.1% of a urea-formaldehyde resin, and the balance of water. The gel temporary plugging agent is formed by underground gelation.

In one embodiment of the present invention, the degradable crosslinking agent is at least one of polyethylene glycol diacrylate and 1,6-hexanediol diacrylate.

In one embodiment of the present invention, the high-temperature initiator is at least one of dicumyl peroxide, tert-butyl peroxybenzoate, and tert-butyl hydroperoxide.

In one embodiment of the present invention, the gel temporary plugging agent further comprises a pH adjuster, and the pH of the gel temporary plugging agent is adjusted to 6.5 to 8.5 by the pH adjuster.

The present invention also aims to disclose an application of a double-crosslinked thermal phase transition gel temporary plugging agent to temporary plugging in an oil and gas reservoir, wherein the temperature of the oil and gas reservoir is 100-150° C., and the injection method uses shear injection. Under this condition, the double-crosslinked thermal phase transition gel temporary plugging agent of the present invention is cured for 0.5-3 h, and the curing time is adjustable; meanwhile, the gel temporary plugging agent can be automatically degraded under the aforementioned working conditions after gelation, and the degradation time is also adjustable and is usually within 48-96 h. Meanwhile, the gel temporary plugging agent of the present invention also has good salt resistance, can be applied to saline water with a mineralization of 22×104 mg/L, and can be suitable for most of the current high-temperature and high-salt oil and gas reservoirs. There are many existing shear injection methods, all of which can be applied to the present invention.

Beneficial effects: (1) according to the gel temporary plugging agent of the present invention, acrylic acid, 2-acrylamide-2-methylpropanesulfonic acid and hydroxyethyl acrylate are used as polymerization monomers, an acrylate crosslinking agent and a boron crosslinking agent are added, and the obtained double-crosslinked gel temporary plugging agent can effectively dissipate energy when subjected to external forces, so that the strength and the toughness of the gel temporary plugging agent are further improved;

(2) the raw materials for preparing the gel temporary plugging agent of the present invention comprise an unstable crosslinking agent containing an ester group, when the gel temporary plugging agent is heated, the ester group is hydrolyzed, and the gel temporary plugging agent is automatically broken and degraded without additional gel breaking means; the present invention can adjust the degradation time by adjusting an amount of the unstable crosslinking agent, pH value and temperature of the system;

(3) the initiator used by the gel temporary plugging agent system of the present invention is a high-temperature initiator, which has strong initiation activity only under higher temperature conditions, so that the system can be applied to high-temperature reservoirs;

(4) the urea-formaldehyde resin and the palygorskite attapulgite are introduced, so that the initial liquid before gelation has certain thixotropic properties, the low-viscosity migration of the gel temporary plugging agent can be achieved, the filtration loss of the temporary plugging agent is reduced, the urea-formaldehyde resin can be degraded along with the degradation of the gel temporary plugging agent under the high-temperature condition, and the flowback of the degraded liquid is facilitated.

BRIEF DESCRIPTION OF DRAWINGS

FIG. 1 is a graph showing the change in filtration loss of the product of Example 1 before gelation with shear rate.

DETAILED DESCRIPTION OF THE EMBODIMENTS

The present invention is further described in detail below with reference to the examples and drawings; however, the embodiments of the present invention are not limited thereto.

In the following examples, the articles are conventional commercial articles in the art unless otherwise specified.

In the following examples, the operations are conventional operations in the art unless otherwise specified.

Example 1

60.4 g of water was added to a 150 ml beaker. 17.8 g of acrylic acid, 6.2 g of 2-acrylamide-2-methylpropanesulfonic acid and 6.6 g of hydroxyethyl acrylate were slowly added to the beaker at a stirring speed of 300 r/min and stirred evenly. 0.6 g of polyethylene glycol diacrylate, 0.8 g of boric acid and 0.6 g of tert-butyl peroxybenzoate were added to the beaker in sequence, and stirring was continued for 10 min. After stirring evenly, 2.9 g of urea-formaldehyde resin and 4.1 g of palygorskite attapulgite were added to the mixed solution in sequence, and stirring was continued for 30 min. Finally, sodium hydroxide was added to adjust the pH to 7 to obtain a reaction solution. 10 g of the reaction solution was weighed and placed in an ampoule. The ampoule was then placed in an aging tank and then in an oven at 130° C. The reaction solution was cured after reacting for 2 h and then continued to be placed at 130° C. The cured gel temporary plugging agent could be completely degraded within 72 h.

Example 2

65.5 g of water was added to a 150 ml beaker. 15.6 g of acrylic acid, 5.3 g of 2-acrylamide-2-methylpropanesulfonic acid and 5.6 g of hydroxyethyl acrylate were slowly added to the beaker at a stirring speed of 300 r/min and stirred evenly. 0.6 g of polyethylene glycol diacrylate, 0.7 g of boric acid and 0.5 g of tert-butyl peroxybenzoate were added to the beaker in sequence, and stirring was continued for 10 min. After stirring evenly, 2.5 g of urea-formaldehyde resin and 3.9 g of palygorskite attapulgite were added to the mixed solution in sequence, and stirring was continued for 30 min. Finally, sodium hydroxide was added to adjust the pH to 7 to obtain a reaction solution. 10 g of the reaction solution was weighed and placed in an ampoule. The ampoule was then placed in an aging tank and then in an oven at 150° C. The reaction solution was cured after reacting for 1 h and then continued to be placed at 150° C. The cured gel temporary plugging agent could be completely degraded within 48 h.

Example 3

69.5 g of water was added to a 150 ml beaker. 12.9 g of acrylic acid, 4.8 g of 2-acrylamide-2-methylpropanesulfonic acid and 5.2 g of hydroxyethyl acrylate were slowly added to the beaker at a stirring speed of 300 r/min and stirred evenly. 0.6 g of 1,6-hexanediol diacrylate, 0.8 g of boric acid and 0.8 g of dicumyl peroxide were added to the beaker in sequence, and stirring was continued for 10 min. After stirring evenly, 2.2 g of urea-formaldehyde resin and 3.2 g of palygorskite attapulgite were added to the mixed solution in sequence, and stirring was continued for 30 min. Finally, sodium hydroxide was added to adjust the pH to 7 to obtain a reaction solution. 10 g of the reaction solution was weighed and placed in an ampoule. The ampoule was then placed in an aging tank and then in an oven at 130° C. The reaction solution was cured after reacting for 1.5 h and then continued to be placed at 130° C. The cured gel temporary plugging agent could be completely degraded within 72 h.

Example 4

71.8 g of water was added to a 150 ml beaker. 11.5 g of acrylic acid, 5.1 g of 2-acrylamide-2-methylpropanesulfonic acid and 4.6 g of hydroxyethyl acrylate were slowly added to the beaker at a stirring speed of 300 r/min and stirred evenly. 0.5 g of polyethylene glycol diacrylate, 0.6 g of borax and 0.5 g of tert-butyl peroxybenzoate were added to the beaker in sequence, and stirring was continued for 10 min. After stirring evenly, 2.5 g of urea-formaldehyde resin and 2.8 g of palygorskite attapulgite were added to the mixed solution in sequence, and stirring was continued for 30 min. Finally, sodium hydroxide was added to adjust the pH to 7 to obtain a reaction solution. 10 g of the reaction solution was weighed and placed in an ampoule. The ampoule was then placed in an aging tank and then in an oven at 100° C. The reaction solution was cured after reacting for 3 h and then continued to be placed at 100° C. The cured gel temporary plugging agent could be completely degraded within 96 h.

Example 5

73.1 g of water was added to a 150 ml beaker. 6.8 g of acrylic acid, 6.3 g of 2-acrylamide-2-methylpropanesulfonic acid and 6.5 g of hydroxyethyl acrylate were slowly added to the beaker at a stirring speed of 300 r/min and stirred evenly. 0.8 g of 1,6-hexanediol diacrylate, 0.6 g of boric acid and 0.6 g of dicumyl peroxide were added to the beaker in sequence, and stirring was continued for 10 min. After stirring evenly, 2.7 g of urea-formaldehyde resin and 2.6 g of palygorskite attapulgite were added to the mixed solution in sequence, and stirring was continued for 30 min. Finally, sodium hydroxide was added to adjust the pH to 7 to obtain a reaction solution. 10 g of the reaction solution was weighed and placed in an ampoule. The ampoule was then placed in an aging tank and then in an oven at 130° C. The reaction solution was cured after reacting for 2 h and then continued to be placed at 120° C. The cured gel temporary plugging agent could be completely degraded within 80 h.

Example 6

74.1 g of water was added to a 150 ml beaker. 9.6 g of acrylic acid, 3.9 g of 2-acrylamide-2-methylpropanesulfonic acid and 4.3 g of hydroxyethyl acrylate were slowly added to the beaker at a stirring speed of 300 r/min and stirred evenly. 0.6 g of polyethylene glycol diacrylate, 1.2 g of boric acid and 0.8 g of tert-butyl peroxybenzoate were added to the beaker in sequence, and stirring was continued for 10 min. After stirring evenly, 1.9 g of urea-formaldehyde resin and 3.6 g of palygorskite attapulgite were added to the mixed solution in sequence, and stirring was continued for 30 min. Finally, sodium hydroxide was added to adjust the pH to 7 to obtain a reaction solution. 10 g of the reaction solution was weighed and placed in an ampoule. The ampoule was then placed in an aging tank and then in an oven at 130° C. The reaction solution was cured after reacting for 1.5 h and then continued to be placed at 130° C. The cured gel temporary plugging agent could be completely degraded within 60 h.

Example 7

70.7 g of water was added to a 150 ml beaker. 10.3 g of acrylic acid, 5.8 g of 2-acrylamide-2-methylpropanesulfonic acid and 5.2 g of hydroxyethyl acrylate were slowly added to the beaker at a stirring speed of 300 r/min and stirred evenly. 0.4 g of polyethylene glycol diacrylate, 0.6 g of boric acid and 0.6 g of tert-butyl hydroperoxide were added to the beaker in sequence, and stirring was continued for 10 min. After stirring evenly, 2.8 g of urea-formaldehyde resin and 3.6 g of palygorskite attapulgite were added to the mixed solution in sequence, and stirring was continued for 30 min. Finally, sodium hydroxide was added to adjust the pH to 7 to obtain a reaction solution. 10 g of the reaction solution was weighed and placed in an ampoule. The ampoule was then placed in an aging tank and then in an oven at 150° C. The reaction solution was cured after reacting for 1 h and then continued to be placed at 150° C. The cured gel temporary plugging agent could be completely degraded within 40 h.

Comparative Example 1

The polyethylene glycol diacrylate and the boric acid in Example 1 were replaced with an equal mass of N,N-methylenebisacrylic acid, and the other components, the amounts, and the reaction conditions were the same as those in Example 1. The gelation was performed for 2 h, and this system still cannot be degraded after aging at 130° C. for 10 days.

Comparative Example 2

The boric acid in Example 1 was replaced with an equal mass of polyethylene glycol diacrylate, the other components, the amounts and the reaction conditions were the same as those in Example 1, and the gel temporary plugging agent was obtained. The compression strain was set to 50%, and the stresses of Example 1 and Comparative Example 2 were 62.8 KPa and 17.9 KPa respectively. It can be seen from the comparison that the gel temporary plugging agent with the second crosslinking agent added has stronger toughness and compression performance than the gel temporary plugging agent of a system without the second crosslinking agent added.

1. Plugging performance test:

The temporary plugging agent formulations of Examples 1 to 6 were taken as research objects, marked as No. 1 to No. 6, respectively, and the plugging and degradation capacities of the temporary plugging agent formulations were examined by a water flooding permeability method. The experimental steps were as follows: filling a sand-filled pipe with a length of 30 cm and a diameter of 2.5 cm with quartz sand of different meshes, performing water injection displacement on the sand-filled pipe at a displacement speed of 1 mL/min, and measuring the original permeability k0 after the pressure was stable. Plugging rate determination: the gel temporary plugging agents in Examples 1 to 6 were injected into the sand-filled pipes and cured at 130° C. to form plugging; after the gel temporary plugging agent was cured into a gel, the sand-filled pipe was subjected to water injection displacement at a displacement rate of 1 mL/min; and after the pressure difference was stabilized for half an hour, the permeability k1 after plugging was measured and shown in Table 1. The gel temporary plugging agent was degraded at a constant temperature of 130° C.; after complete degradation, the sand-filled pipe was subjected to water injection displacement at a displacement rate of 1 mL/min, and the permeability k2 after degradation was measured and shown in Table 1. The plugging rate E was calculated by the following formula:

$$E_x = (k_0 - k_x)/k_0, (x = 1, 2).$$

TABLE 1

Plugging and plugging removal test for temporary plugging agent

| | | Before degradation | | After degradation | |
| --- | --- | --- | --- | --- | --- |
| Example | $k_0$, μm² | $k_1$, μm² | $E_1$, % | $k_2$, μm² | $E_2$, % |
| No. 1 | 1.314 | 0.004 | 99.69 | 1.305 | 0.68 |
| No. 2 | 1.263 | 0.006 | 99.52 | 1.251 | 0.95 |
| No. 3 | 1.196 | 0.007 | 99.41 | 1.189 | 0.59 |
| No. 4 | 1.254 | 0.004 | 99.68 | 1.249 | 0.39 |
| No. 5 | 1.349 | 0.005 | 99.63 | 1.341 | 0.59 |
| No. 6 | 1.285 | 0.008 | 99.38 | 1.281 | 0.31 |
| No. 7 | 1.358 | 0.011 | 99.19 | 1.349 | 0.66 |

The results show that the gel temporary plugging agent has a plugging rate higher than 99% before degradation and lower than 1% after degradation, which shows that the gel temporary plugging agent has excellent plugging and degradation performances.

2. The temporary plugging agent formulation of Example 1 was used as a research object, and the viscosity and filtration loss of the formulation were tested based on the standard SY/T 5107-2005. The results are shown in FIG. 1.

It can be seen from FIG. 1 that the viscosity of the initial liquid of the gel temporary plugging agent gradually decreases and finally stabilizes with the increase of the shear rate, which indicates that the initial liquid of the gel temporary plugging agent has thixotropic properties of shear thinning and standing thickening, and it can also be seen that the initial liquid of the gel temporary plugging agent has higher viscosity and lower filtration loss when standing.

The palygorskite attapulgite and the urea-formaldehyde resin in Example 1 were replaced with an equal mass of deionized water, and the other components, the amounts and the reaction conditions were consistent with those of Example 1. The shear rate is 0, the viscosity of the obtained gel temporary plugging agent is 8.6 mpa·s, and the filtration loss reaches 82.9 mL.

In summary, combined with the characteristics of the gel temporary plugging agent of the example of the present invention, in the actual use, the viscosity of the initial liquid of the temporary plugging agent can be reduced by shear injection, so that the temporary plugging agent has better pumping performance. Since the thixotropic gel injected after the shear injection maintains a relatively low viscosity under the action of the flowing stress, the pumping pressure can still be maintained at a low level during the injection process. When the gel temporary plugging agent descends to a predetermined plugging position, the fluidity decreases, and the viscosity gradually recovers to a high viscosity, so that the filtration loss of the initial liquid of the gel temporary plugging agent can be greatly reduced, and the gel temporary plugging agent after gelation has higher plugging rate and lower damage degree to a matrix.

The initial liquid of the gel temporary plugging agent injected into the stratum is subjected to gelation at a temperature of 100-150° C., so that temporary plugging is generated on the bottom layer. Based on different amounts of materials added in the gel temporary plugging agent, the gel temporary plugging agent begins to degrade after a period of time after gelation, and the permeability of the reservoir recovers after complete degradation.

The above descriptions are merely preferred specific embodiments of the present invention, however, the protection scope of the present invention is not limited thereto, and any modifications and substitutions that can be easily conceived by those skilled in the art within the technical scope disclosed by the present invention shall fall within the protection scope of the present invention.

What is claimed is:

1. A double-crosslinked thermal phase transition gel temporary plugging agent, comprising the following components in percentage by weight: 5.8-18.3% of acrylic acid, 2.8-6.5% of 2-acrylamide-2-methylpropanesulfonic acid, 2.8-7.0% of hydroxyethyl acrylate, 0.2-1.0% of a degradable crosslinking agent, 0.4-1.2% of borax or boric acid, 0.2-0.8% of a high-temperature initiator, 2.6-4.5% of palygorskite attapulgite, 1.5-3.1% of a urea-formaldehyde resin, and a balance of water, wherein the gel temporary plugging agent is formed by underground gelation; and the degradable crosslinking agent is at least one of polyethylene glycol diacrylate and 1,6-hexanediol diacrylate, and the high-temperature initiator is at least one of dicumyl peroxide, tert-butyl peroxybenzoate, and tert-butyl hydroperoxide.

2. The double-crosslinked thermal phase transition gel temporary plugging agent according to claim 1, further comprising a pH adjuster, wherein a pH of the gel temporary plugging agent is adjusted to 6.5 to 8.5 by the pH adjuster.

\* \* \* \* \*